Nov. 22, 1960     C. E. TIBBALS     2,961,021
METHOD OF AND APPARATUS FOR MAKING PARQUET FLOORING BLOCKS
Filed June 18, 1957
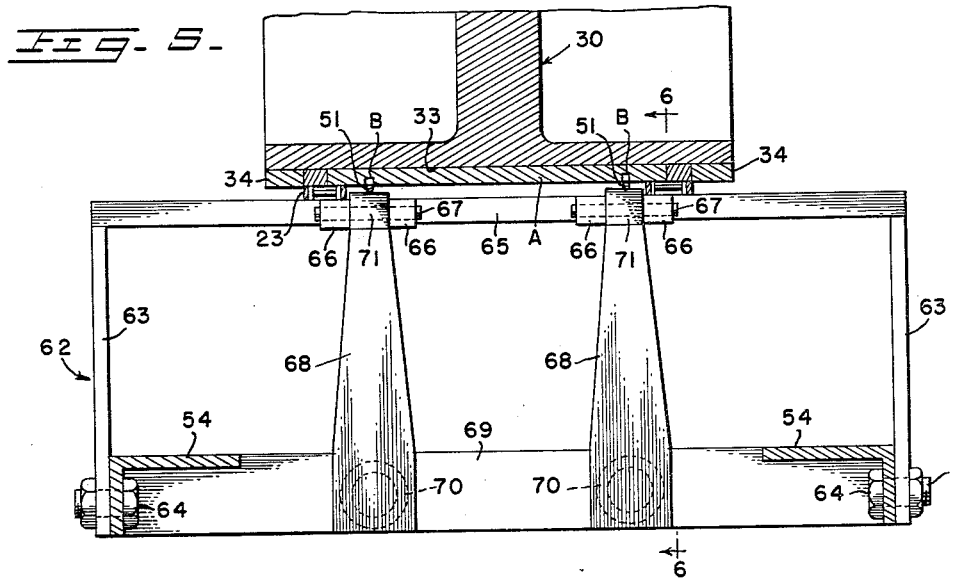
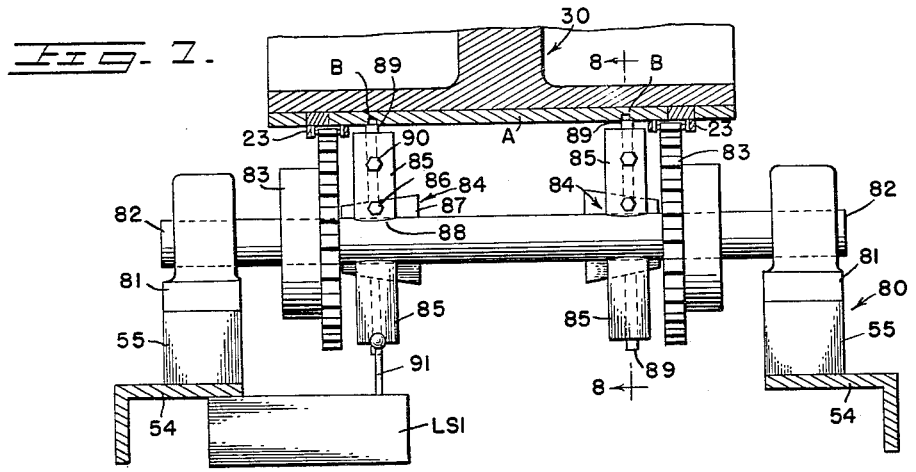
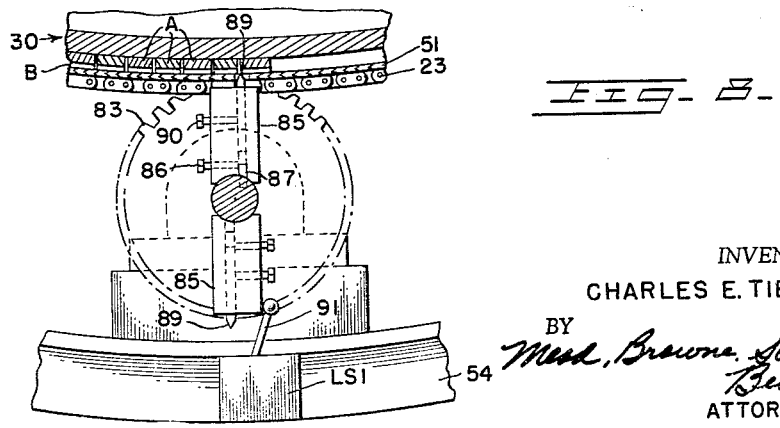
INVENTOR.
CHARLES E. TIBBALS Nov. 22, 1960     C. E. TIBBALS     2,961,021
METHOD OF AND APPARATUS FOR MAKING PARQUET FLOORING BLOCKS
Filed June 18, 1957     7 Sheets-Sheet 6
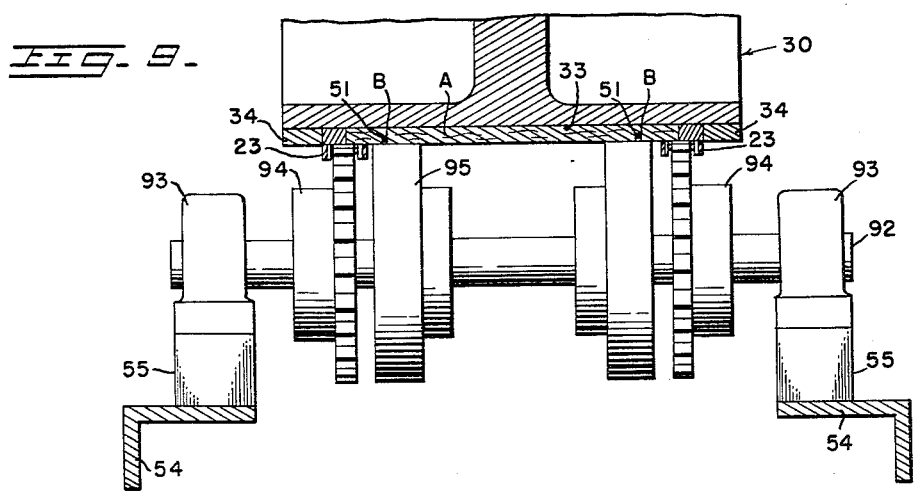
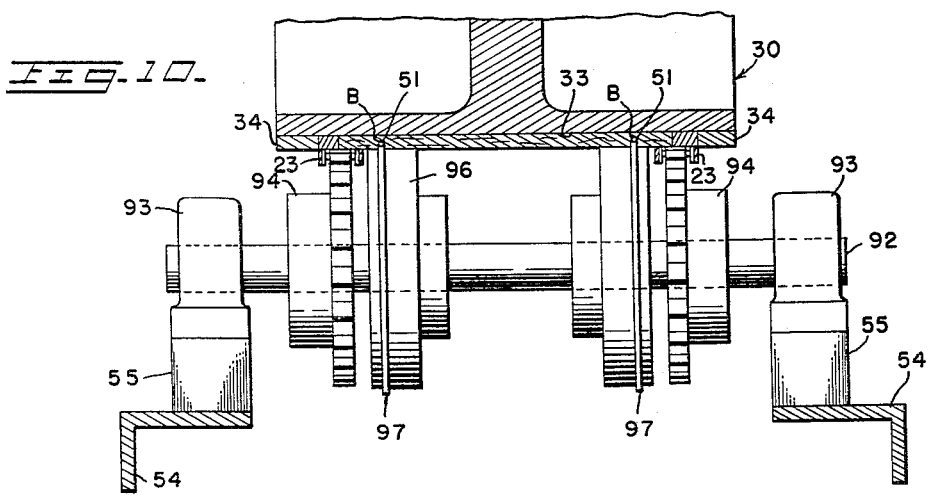
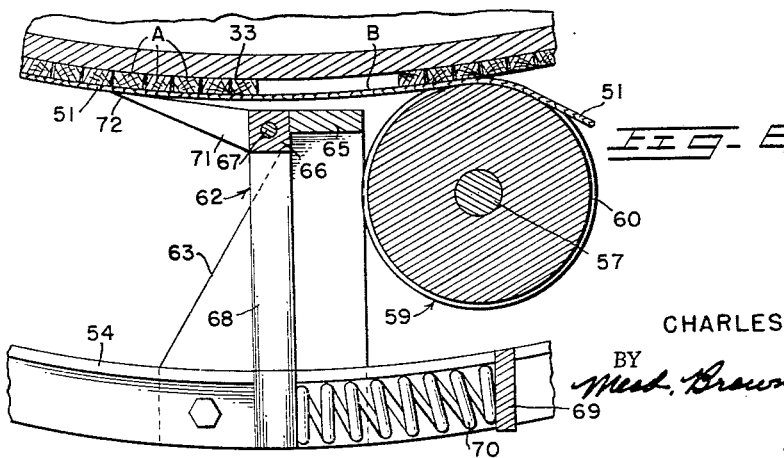
INVENTOR.
CHARLES E. TIBBALS
ATTORNEYS Nov. 22, 1960 C. E. TIBBALS 2,961,021
METHOD OF AND APPARATUS FOR MAKING PARQUET FLOORING BLOCKS
Filed June 18, 1957 7 Sheets-Sheet 7
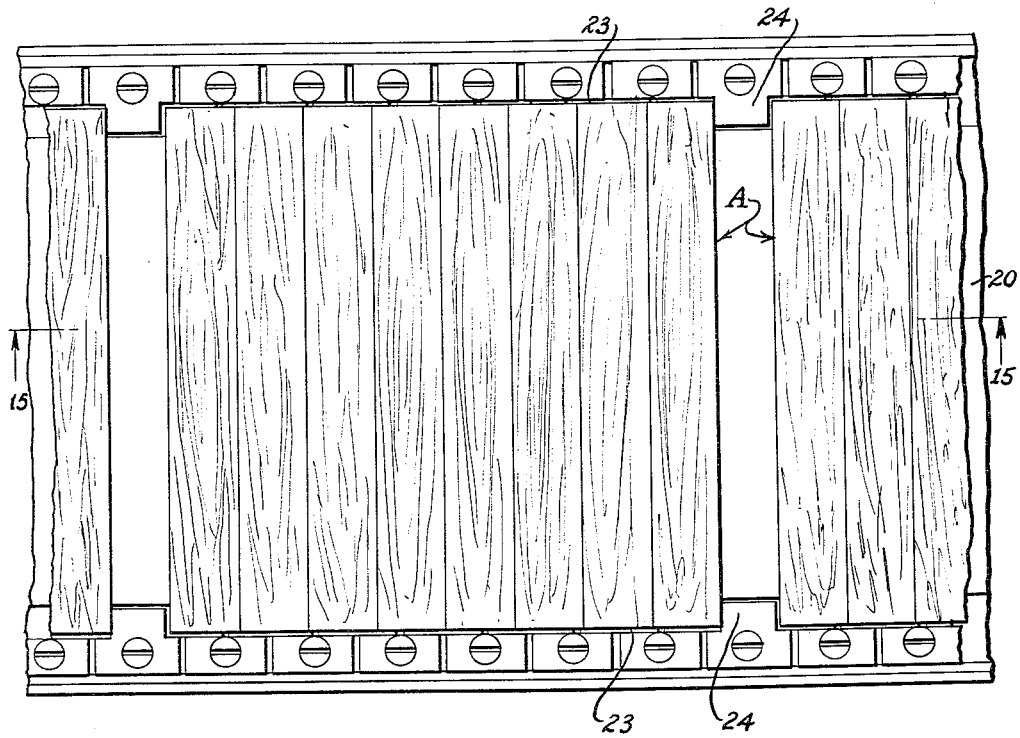
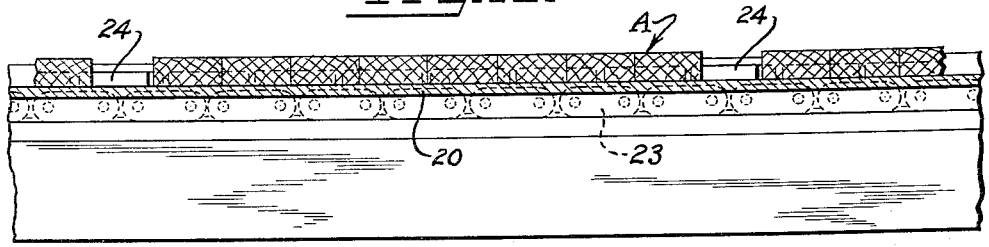
INVENTOR
Charles E. Tibbals
BY Mead, Browne, Schuyler and Beveridge
ATTORNEYS United States Patent Office 2,961,021
Patented Nov. 22, 1960

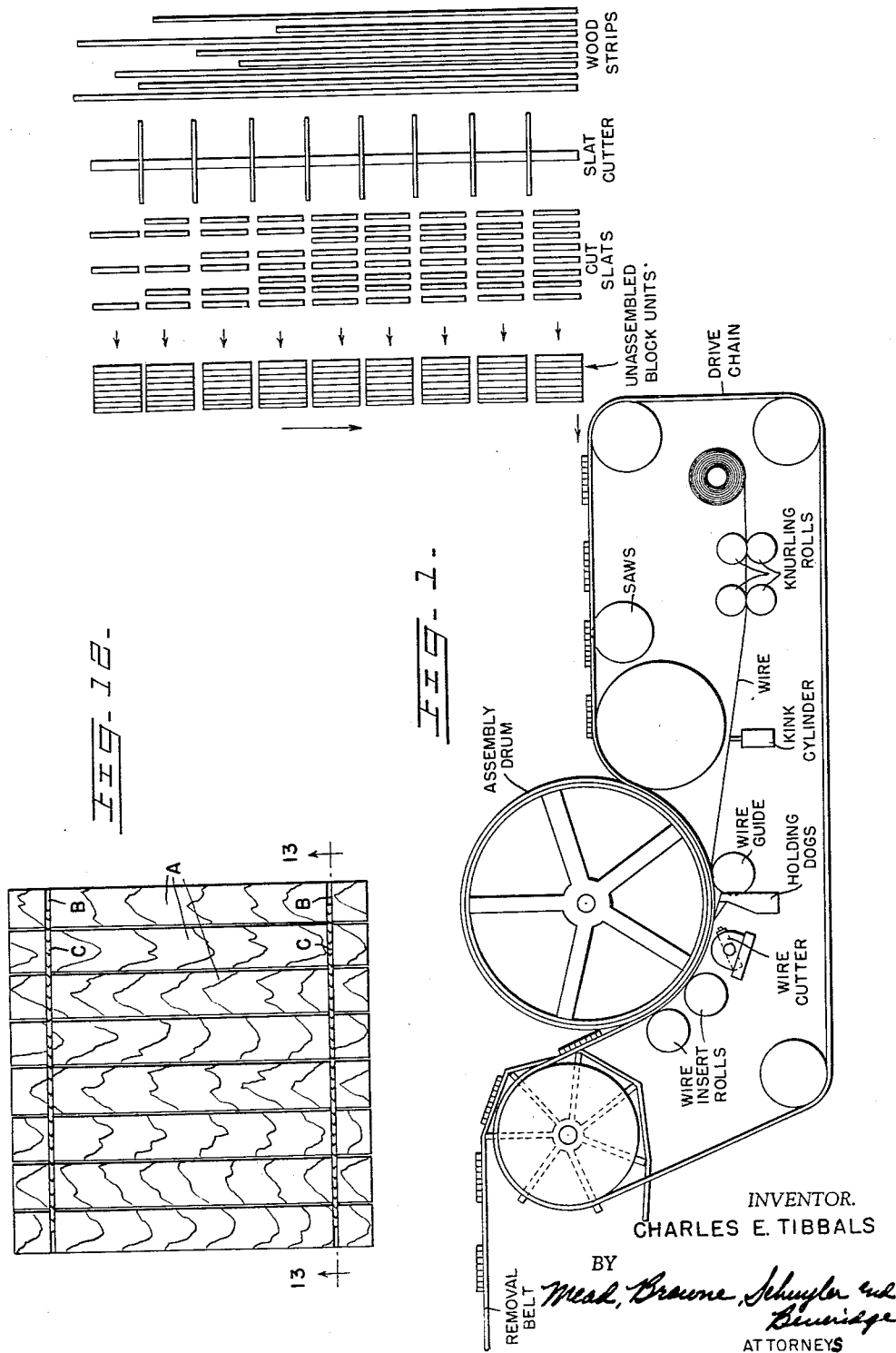

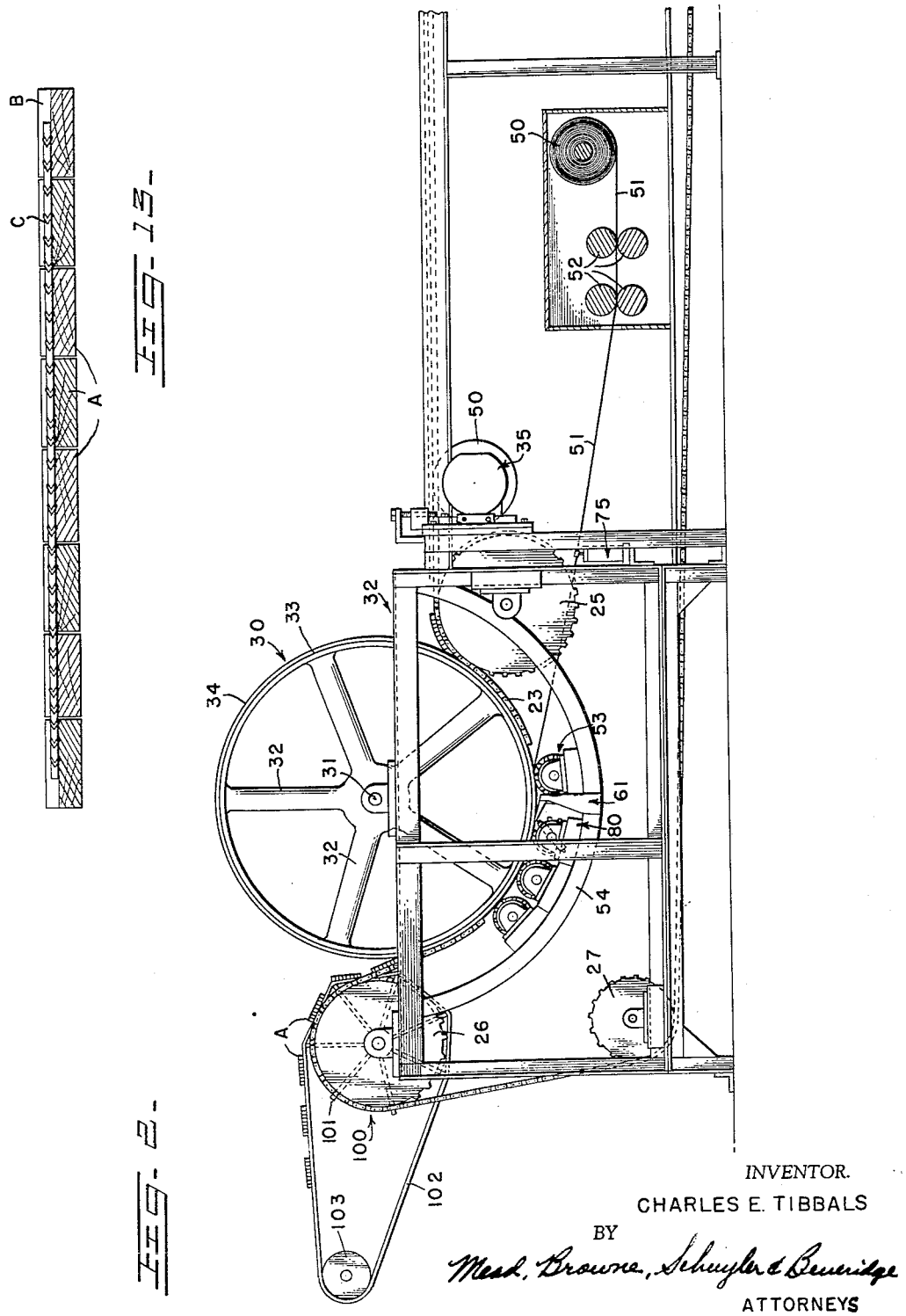

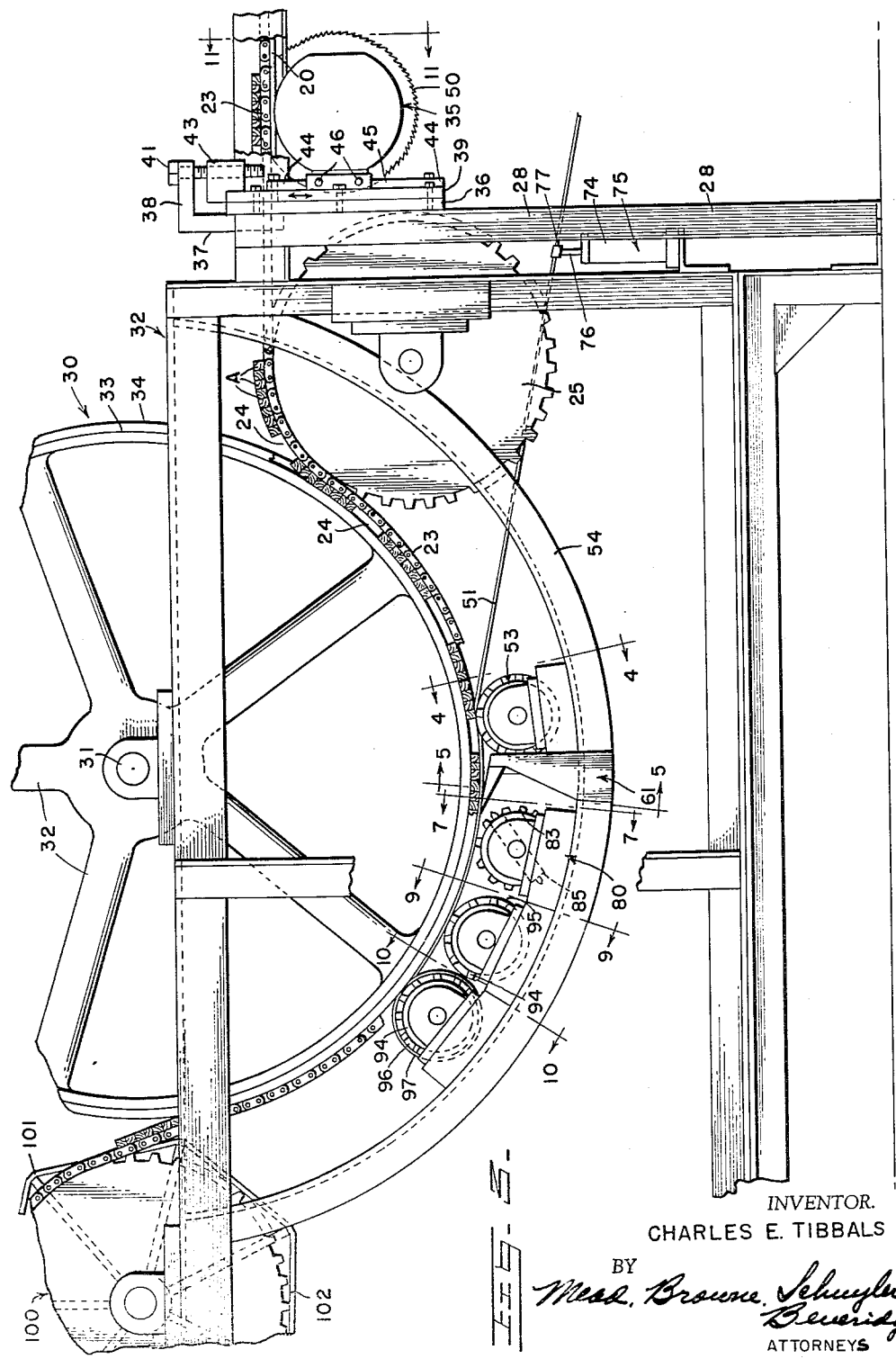

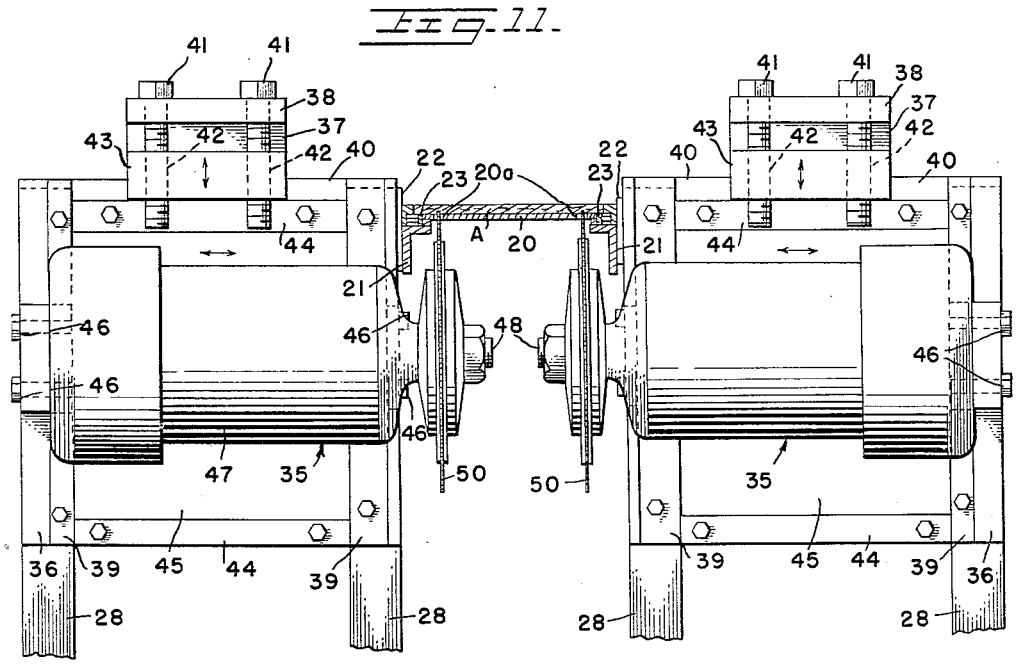
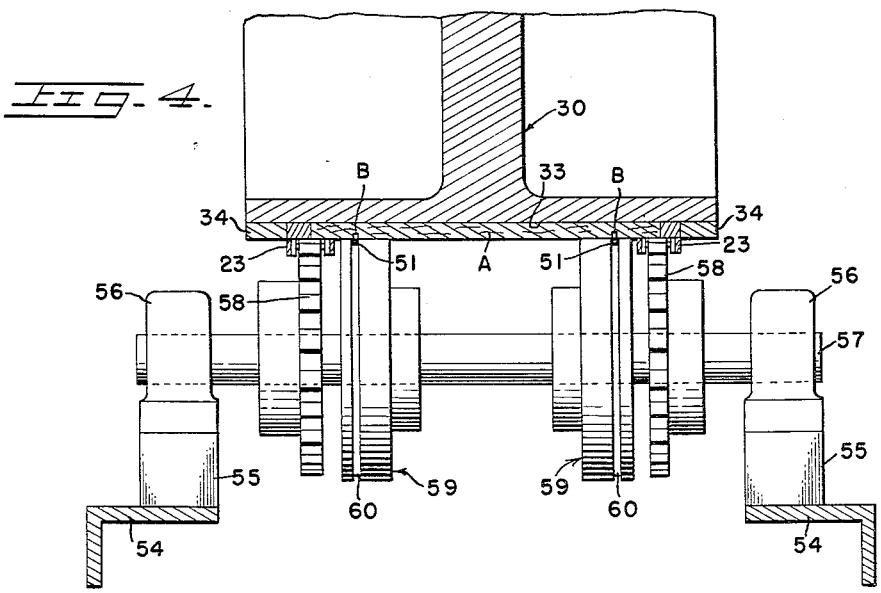

1

2,961,021

METHOD OF AND APPARATUS FOR MAKING PARQUET FLOORING BLOCKS

Charles E. Tibbals, Oneida, Tenn., assignor to Wood Products Development Company, Inc., Oneida, Tenn., a corporation of Tennessee Filed June 18, 1957, Ser. No. 666,322

10 Claims. (Cl. 144—318)

The present invention relates to a method of and apparatus for making parquet flooring blocks. More particularly, this invention proposes a method of making parquet floor units or blocks by compiling formed wooden slats into flooring units and securing the slats into a discrete parquet block. Additionally, the invention relates to an apparatus for carrying out this method and specifically includes novel means for assembling and securing the block components.

This application is a continuation in part of my earlier filed application, Serial Number 657,184 filed May 6, 1957.

In this earlier application, I have disclosed a method of and apparatus for securing individual hardwood strips or slates to form a discrete flooring block for subsequent utilization at the construction site by assembly into a completed floor. By the method of the present invention, a block is obtained which comprises a plurality of wooden strips or slats which are assembled in edgewise, spaced relation and held in assembly by a knurled wire or, preferably, by a plurality of such wires recessed into the back of the block and terminating short of the block edges, so that these edges may be subsequently finished by conventional wood finishing procedures.

The present invention is primarily concerned with a method of and apparatus for producing such blocks.

In my earlier application, I have disclosed a method of and apparatus for forming individual elongated wooden strips which are cut into slats of the proper size and shape, the individual slats being conveyed to a sorting apparatus at which the slats are sorted into and retained in unassembled, but grouped relation. These groups of slats each contain the number of slats necessary to form a complete flooring block and the unit identities of the groups are maintained during introduction of the slats onto a conveying medium, preferably a pair of transversely spaced chains upon which the slats are supported and which are provided with drive lugs which are interposed between adjacent groups of slats and which also serve to move the slats along the length of the chain.

According to the present invention, the slats, while retained by the chains, are contacted by suitable means, such as spaced circular saws, to form grooves in the under surfaces of the slats. Next, the slats are contacted with a concave backing surface, and a wire is introduced into each of the grooves. The wire is preferably larger in diameter than the groove width, and means are provided for forceably inserting the oversized wire in each of the grooves. The wire is cut to a length less than the longitudinal extent of the group of slats by means of a rotary cutting apparatus and a reciprocatory wire-kinking mechanism cooperates with the wire guiding apparatus to intermittently feed the wire to the continuously traveling groups of slats.

It is, therefore, an important object of the present invention to provide a new, novel, and improved method of making a parquet flooring block.

Another important object of the present invention is the provision of a novel apparatus for making parquet flooring blocks.

It is a further important object of this invention to provide an improved method for securing a group of slats into flooring units by the grooving of the slats and the insertion of a wire into the slat grooves.

Another object is a provision of an apparatus capable of grooving individual wooden slats and inserting a wire into the slat grooves to secure the slats into a discrete flooring block.

It is still another object of this invention to provide a method of making a parquet flooring block or unit by conveying a plurality of slats in group relation, grooving the slats transversely of the slat length, inserting a wire into the slat grooves, and cutting the wire to form a discrete flooring block.

Yet another important object is the provision of an apparatus for making parquet flooring blocks including a continuously traveling conveyor chain, circular saw means for grooving slats conveyed by the chain, means guiding a wire into the slat grooves, and cutting means for severing the wire.

These and other objects will be more apparent from the following detailed description of a preferred embodiment of this invention and by reference to the drawings forming a part thereof, wherein:

On the drawings:

Figure 1 is a schematic representation of a method of and apparatus for making parquet flooring blocks in accordance with the present invention;

Figure 2 is an elevational view of a portion of the apparatus of the present invention utilized for assembling the individual slats into finished flooring units;

Figure 3 is an enlarged fragmentary view similar to Figure 2 illustrating in greater detail the apparatus of the present invention;

Figure 4 is an enlarged sectional view taken along the plane 4—4 of Figure 3;

Figure 5 is an enlarged sectional view taken along the plane 5—5 of Figure 3;

Figure 6 is a sectional view taken along the plane 6—6 of Figure 5;

Figure 7 (sheet 5) is an enlarged sectional view taken along the plane 7—7 of Figure 3;

Figure 8 is a sectional view taken along the plane 8—8 of Figure 7;

Figure 9 (sheet 6) is an enlarged sectional view taken along the plane 9—9 of Figure 3;

Figure 10 is an enlarged sectional view taken along the plane 10—10 of Figure 3;

Figure 11 (sheet 4) is an enlarged sectional view taken along the plane 11—11 of Figure 3;

Figure 12 (sheet 1) is a plan view of the underside of a finished parquet flooring block prepared by the method and apparatus of the present invention;

Figure 13 (sheet 2) is an enlarged sectional view taken along the plane 13—13 of Figure 12;

Figure 14 is an enlarged fragmentary plan view illustrating the slats disposed upon the drive chains; and Figure 15 is a sectional view taken along the plane 15—15 of Figure 14.

As shown on the drawings:

General method

In Figure 1, the entire method and apparatus of the present invention is diagrammatically illustrated.

As indicated thereon, the elongated relatively narrow wooden strips of a width and thickness suitable for the formation of rough finished parquet flooring blocks are formed into cut slats of desired size by passing the strips through a gang cutter, preferably of the rotary saw type, wherein a plurality of saw blades are disposed upon a common power driven shaft. The strips are of random length, thus permitting the use of otherwise unusable scrap material.

The cut slats are then conveyed longitudinally from the slat cutter to a sorting station at which the slats are subdivided into unassembled block units containing the appropriate number of slats necessary to form a complete flooring block. These unassembled units are formed by a transversely operating, reciprocating sorting mechanism. The block units are conveyed laterally for transfer onto an endless drive chain provided with means for retaining the identity of the individual block units.

The cutting apparatus, the slat conveying apparatus, and the sorting mechanism are fully described in my earlier filed application, Serial Number 657,184, hereinbefore referred to. This cutting, conveying, and sorting mechanism forms no part of the present invention and need not be disclosed in detail herein.

After having been transferred to the drive chain, the slats are conveyed in unassembled, but unit separated, groups to an assembly drum about which the drive chain is partially lapped. Prior to introduction of the chain onto the assembly drum, the undersurfaces of the slats are contacted by one or more circular saws which cut partially through each slat to groove the undersurface thereof. As the drive chain is partially lapped about the assembly drum, the slat units are deformed to a concave configuration and, while being retained of this configuration, a wire is guided into each of the grooves formed on the undersurface of the slats. This wire passes through a cutting apparatus which severs the wire short of the end of the slat unit. In order that the wire may be properly presented to the next succeeding slat unit, a kink cylinder is actuated in response to the cutting operation, this cylinder effectively jerking the wire rearwardly beneath a holding dog. The stroke of the kink cylinder is correlated with the speed of travel of the block units, so that the free end of the wire is properly presented to the next group of slats. Following severing of the wire, the wire is pushed into the groove as to be firmly embedded therein by means of wire insert rolls. Next, the discrete, assembled flooring unit is removed from the chain by means of a removal belt.

The details of the specific method and the specific apparatus proposed by the present invention will be better appreciated by an inspection of the drawings and a study of the detailed apparatus hereinafter described.

Drive chain and assembly drum

As best illustrated in Figures 2, 3 and 11 of the drawings, the apparatus includes an elongated supporting surface 20 which is adapted to receive thereon the individual groups of slats from a slat cutting, conveying, and sorting apparatus such as that described in my earlier application, Serial Number 657,184. Confined between each lateral extremity of the plate 20 and the corresponding end plate 22 is a conveyer chain, indicated generally at 23. These conveyer chains are similar to the chains described in my earlier filed application and such chains are conventional roller chains having links interconnected through chain blocks and having driving lugs 24 uniformly spaced along the length of the chain, which are adapted to be interposed between adjacent groups of slats A, as best shown in Figures 3, 14 and 15. As fully explained in my earlier application, the chains 23 are laterally spaced through a distance slightly greater than the longitudinal dimension of the slats A, and the driving lugs 24 project inwardly, so as to contact the side surfaces of the adjacent slats A. The lugs 24 thus drivingly engage the slats and also serve to space the groups of slats A, which have been earlier separated and formed by the transversely acting sorting mechanism which forms a portion of my earlier invention.

The chains 23 are trained about a plurality of pairs of sprockets 25 and 26 which are positioned along the length of travel of each of the chains 23 to either side of an assembly drum 30. This assembly drum 30 is located for rotation about a horizontal axle 31 which is supported for rotation in a fixed frame 32. The laterally spaced sprockets 25 are supported by the frame 32 in advance of and below the axis of the drum 30, while the sprockets 26 are supported adjacent to the discharge end of assembly drum 30. A pair of transversely spaced lower return sprockets 27 are provided for returning the chain to the entry end of the conveying surface 20.

The assembly drum 30 is provided with a plurality of radial spokes 32 and a peripheral surface 33 which is of a width substantially equal to the length of the individual slats A (Figure 4). Actually, the assembly surface 33 of the assembly drum 30 is interposed between a pair of annular guide rings 34 secured to the wheel to prevent lateral displacement of the slats A from the surface 33.

The chains 23 are driven by the sprockets 26, respectively, the driving means not being shown on the drawings but forming a part of the driving apparatus for the complete cutting, assembling, supporting and assembly apparatus, as disclosed in my earlier application.

Slat grooving apparatus

As best shown in Figures 3 and 11, the individual slats A conveyed upon the surface 20 by means of the chains 23 are grooved immediately before their passage about the sprocket 25 into contact with forming drum 30.

Referring now to Figure 11, it will be seen that a pair of laterally spaced, individual saw units 35 are provided, the saw units being mirror images of one another, so that only one such unit 35 need be described in detail.

The vertical supporting posts 28 for the surface 20 are joined by a transversely extending fixed guide plate 36 (Figure 3), this guide plate being secured to each of the posts 28 at one side of the conveying surface 20 and carrying at its upper extremity a vertical extension 37 having a flange 38 extending parallel to the surface 20, but laterally displaced to one side thereof as illustrated in Figure 11. This plate 36 also has secured thereto a pair of laterally spaced vertically extending bevel guide elements 39 which serve to guide a vertically adjustable plate 40 with respect to the plate 36 by means of a pair of transversely spaced dependency screws 41 depending from the flange 38 and received in threaded, vertical apertures 42 formed in an embossment 43 carried by the plate 40 and underlying the flange 38. Upon threaded adjustment of the screws 41, the plate 40 will be adjusted vertically.

The plate 40 carries a pair of transversely extending beveled guide elements 44 having interposed therebetween a laterally adjustable plate 45. This plate 45 is adjustable laterally through a pair of sets of opposed separate screws 46 carried by the plate 40 and abutting the opposed vertical edges of the transversely adjustable plate 45.

The plate 45 carries secured thereto the saw unit 35 which comprises a motor housing 47, a motor drive shaft 48 projecting beyond the housing, and a vertically extending saw blade 50 carried by each of the shafts 48. The saw blades 50 are adjustable vertically, by adjustment of the screws 41, and laterally, by adjustment of the screws 46, so that the blade periphery projects through slots 20a formed in the surface 20 and into contact with the undersurface of the slats A supported on the surface 20.

In a preferred embodiment of the invention, the projection of the saw blades into the undersurface of the slats A is such that a slot is formed adjacent each longitudinal extremity of the slat, the slots extending transversely of the slats and preferably in a direction disposed normally with respect to the grain of the wood composing the slot. In this preferred embodiment, a pair of saws are utilized as specifically illustrated in Figure 11 of the drawings.

From Figure 3, it will be seen that the slats A having the grooves or slots B formed in the under surfaces thereof are next guided into contact with the peripheral surface 33 of the assembly drum 30 by passage of the chains about the sprockets 25. The sprockets are sufficiently spaced from the periphery of the drum 30 that the slats and chains are fed into close intimate contact with the periphery of the drum. The deflection of the chain 23 from its normal plane of movement by contact with the surface of the drum will cause the chain to assume a convex configuration and the tension in the chain will retain the slats A tightly against the drum peripheral surface 33. The chains 23 assume a complementary concave configuration, and the driving lugs 24 of the chain, which project radially of the drum, will have their inner or "upper" ends slightly more closely spaced than their outer or "lower" ends. In other words, the inner ends of adjacent lugs 24 will be closer together than the outer ends of adjacent lugs 24. Similarly, the transverse or height dimensions of the slats A will extend radially of the drum and the edges of the formerly "top" surfaces of adjacent slats will be in tight abutment with the edges of the radially outer or formerly "lower" ends of the slats being spaced slightly. Thus, minute V-shaped spaces will occur between adjacent slats. The application of the wire to the outer or exposed undersurfaces of the slats, the wire being under tension as it is drawn from the supply roll 121, will result in the adherence of adjacent slats to the wire in slightly spaced, nonabutting relation. Since the use of wooden slats gives rise to dimensional variations of comparatively great magnitude, the problem of "squareness" in the block assembly becomes important. The use of the radial lugs squares the block and insures accurate alignment of the slats. Further, each block unit is individually squared by its lugs and the tolerance building is limited to the accumulated variations in a small group of slats, namely the number of slats forming each block. Additionally, the provision of the radially extending lugs 24 of the chain 23 will insure tight abutment between adjacent slats at their inner edges or those edges abutting the drum periphery 30.

*Wire feeding apparatus*

As best illustrated in Figure 2, a coil 50 of wire is provided beneath the conveying surface 20 and remote longitudinally from the sprockets 25. Two such coils of wire are provided in transversely spaced relation, the feeding apparatus being identical for each strand of wire, and only one such strand need be explained in detail.

Each such strand 51 of wire is threaded between a pair of forming or knurling rolls 52 so that wire is provided with a plurality of irregular, radial projections (Figures 6, 12 and 13), thus effectively enlarging the diameter of the wire and substantially roughening the surface thereof. The knurled strand is next led to the periphery of a wire guide and feed roll 53 illustrated in Figures 3 and 4 of the drawings.

It will be noted from Figure 3 that an arcuate support rail 54, generally concentric with the assembly drum 30 and depending from the support frame 32 thereof is provided. Actually, a pair of transversely spaced rails 54 are provided as illustrated in Figure 4 of the drawings, and each rail is surmounted by a support block 55 upon which are superimposed bearing blocks 56 which support for free rotation a transversely extending shaft 57 parallel to the axle of the drum 30. Upon this shaft 57 for corotation therewith are disposed a pair of transversely spaced sprockets 58, these sprockets meshing with the exposed undersurface of the chain 23 and serving to rotate the shaft 57 in synchronism with rotation of the assembly drum 30.

Also disposed upon the shaft 57 intermediate the two sprockets 58 and in alignment with the grooves B of the slats A are a pair of wire guide and feed rolls 59. These rolls 59 are provided with radially extending, peripherally recessed grooves 60 which are of a transverse and radial dimension sufficient to receive the wire strands 51. Actually, the depth of the grooves 60 is slightly less than the enlarged radial dimension of the wires, so that the wires are brought into contact with the undersurfaces of the slats A at the location of the grooves B.

*Wire cutting and kinking apparatus*

As hereinbefore explained, the guide rolls 59 are effective to initially place the knurled wires 51 in the grooves B. Inasmuch as the block must be sized and edge finished after insertion of the wire in the grooves B, it is desirable to have the wire terminate short of the longitudinal extremity of the block but within the confines of the last slat defining the block.

As illustrated in Figures 3 and 5, the wire having been deposited in the slot is fed beneath a retaining dog assembly 61. As best illustrated in Figure 5 of the drawings, this retaining dog assembly comprises a fixed U-shaped frame 62 having a pair of depending legs 63 secured to the support rails 54 by suitable means, as by nuts and bolts 64. The bight portion 65 of the frame 62 extends transversely of the drum in closely spaced relation to the periphery of the assembly drum 30 and in parallelism with the drum axis. This bight portion 65 carries two transversely spaced pairs of ears 66 adapted to receive pivot pins 66a therethrough.

Disposed upon the pivot pins 66a and interposed between each pair of ears 66 is a pivotal retaining dog indicated generally at 67. Each of these dogs 67 comprises a depending actuating arm 68 having its lower portion cooperating with a fixed reaction plate 69 to confine therebetween a compression spring 70, the spring 70 being effective to urge the dog in a clockwise direction, as viewed in Figure 6. Formed integrally with or secured to the depending leg 63 is a dog projection 71 having a terminal chisel point 72 for engaging the wire 51 as it lies against the undersurface of the slats A, the wire having been previously only partially inserted in the grooves B by the rolls 59. The chisel point 72 of each dog is urged against its associated wire under the compression of the spring 70, and the function of the dog is to normally prevent movement of the wire in a direction counter to the direction of rotation of the assembly drum 30.

Secured to one of the legs of the assembly drum stand 32 is a kinking cylinder assembly, indicated generally at 75, and comprising a pneumatically actuated cylinder 74 having a vertically upwardly projecting piston rod 76, the piston rod having a terminal saddle or yoke 77 formed thereon to underlie the wire strand 51. A pair of such piston assemblies 75 are provided, one being vertically aligned with each strand 51 of the wire. Upon actuation of the cylinder assembly to extend the rod 76 and yoke 77 vertically, the associated wire strand 51 will be moved vertically. Because of the resistance to tension in the wire exerted by the forming rolls 52, the length of wire necessary for such vertical or kinking movement must be pulled backwardly relative to the guide rolls 59 and the dog assemblies 61. While the dog assembly 61 is normally effective to prevent such movement of the wire, the rapid, jerking motion upon the wire which is exerted by actuation of the kinking cylinder will be sufficient to jerk the wire rapidly and forcibly beneath the chisel points of the dog assemblies.

The degree of kinking of the wire may be readily regulated by variations in the length of stroke of the piston rod 76.

Immediately forwardly of the dog assembly 61 is located a wire cutting assembly 80 (Figures 3, 7 and 8). This wire cutting assembly comprises a pair of transversely spaced bearings 81 carried on the support rails 54 and supporting a transversely extending shaft 82. Upon this shaft 82 are located a pair of transversely spaced sprockets 83 fixed to the shaft for co-rotation and effective to rotate the shaft by virtue of engagement of the sprocket peripheries with the chains 23 lapped about the periphery of the forming drum 30.

Intermediate the pair of spaced sprockets 83 are a pair of cutting assemblies 84. These cutting assemblies are identical and only one need be illustrated in detail, as in Figure 8. These cutting assemblies comprise a pair of radially extending tubular cutter housings 85 which are secured to the shaft, as by welding indicated by reference numerals 88. The housings 85 threadedly receive set screws 86 which engage cam keys 87 which are recessed radially in the shaft 82 but which are adjustable axially of the shaft. The keys 87 are received in slots formed in the housings 85 and the cam keys 87 contact radially extending cutting blades 89 extending axially through the tubular housings 85. Loosening of the set screws 86 and axial movement of the keys 87 will adjust the cutting element 89 radially of the shaft and also radially of the assembly drum 30.

Additional set screws 90 are provided for fixing the cutters 89 radially of the housing. The cutting tools 89 are conventional machine tool chisel points which, upon contact with the wire, will cut the wire. The speed of rotation of the shaft 82, as determined by the size of the sprockets 83, with respect to the speed of rotation of the assembly drum 30 will determine the length of cut of the cutting elements 89. The wire will be cut twice for each rotation of the shaft 82, and the length of wire may be varied by varying the size of the sprockets 83, if so desired.

Rotation of the cutting tools 89 is also utilized to actuate the kinking cylinders 75. A limit switch LS1 having an actuation arm 91 is located in closely spaced relation to one of the cutting assemblies 84. This limit switch LS1 is carried by one of the support angles 54, and the limit switch actuated each time one of the cutting blades 89 is effective to cut the wire 51. Actuation of the limit switch LS1 will actuate cylinder 75 to kink the wire, thereby jerking the wire backwardly beneath the holding dog assemblies 61 and between the guide rolls 53 and the assembly drum 30. The timing of the cutting operation is such that the wire is severed intermediate the transverse dimension of the last slat in a given group of slats, and the wire kinking stroke of the cylinder assembly 75 is such that the wire is jerked sufficiently rearwardly to space the end of the wire inwardly of the leading edge of the first slat of the next succeeding group of slats. It will be noted that the cutting blade is located in advance of the dog edge a distance equal to the width of the chain lugs 24 which separate the adjacent group of blocks plus twice the distance from the end of the wire to the trailing edge of the last block minus the distance of travel of the next succeeding group of slats during the kinking interval.

Thus, the cutting and kinking operation first cuts the wire through the medium of the cutters 89, then actuates the kinking cylinder 75 by means of the limit switch LS1. Following the kinking cycle the loose end of the wire is retained by the dog assembly 61, thus preventing displacement of the wire completely from the next group of slats. Actually, this loose end of the wire is never displaced from the grooves B of the next group of slats, the wire having been placed in the grooves by the guide rolls 59.

*Wire setting rolls and block removal apparatus*

Following the cutting of the wire, the wires are set in the grooves of the slats by means of successive pairs of wire setting rolls illustrated in Figures 9 and 10.

Each of these sets of rolls is mounted on a transverse shaft 92, carried by the arcuate frame elements 54 through bearings 93, and each of the shafts 92 carries transversely spaced pairs of sprockets 94 meshing with the chains 23. Intermediate the sprockets 94 on each of the shafts 92 are a pair of wire-contacting rolls. One of these pairs of rolls designated by reference numeral 95 has a plain, cylindrical peripheral surface which serves to contact the wire and to push the wire partially into the grooves B. As illustrated in Figure 10, the wires 51 are finally seated in the grooves B by means of wire setting rolls 97 carried on the second or succeeding shaft 92. The rolls 97 have medially located, radially projecting annular ribs 97 formed thereon, these ribs having a rib slightly less than the width of the grooves B to accommodate the entry of the ribs into the grooves and to urge the wires, by direct contact therewith, further into the block. After the wires have been set into the blocks by the co-operation of the setting rolls 95 and 96, the blocks assume their finished form illustrated in Figures 12 and 13 of the drawings, the wire strands 51 having been severed intermediate the adjacent blocks. Next, the conveying chain 23 is trained about the periphery of the discharge sprocket 26 and returned about the sprocket 27. A removal device comprising a paddle wheel assembly 100 having a plurality of elongated radially directed arms 101 is lapped by a removal belt 102, the belt also having a guide roll 103. The removal belt 102 in cooperation with the paddle wheel 101 is interposed between the transversely spaced chains 23 and effectively lifts the assembled block from the chains onto the belt 102 for removal to subsequent sizing and finishing operations.

The completed block as illustrated in Figures 12 and 13 comprises a plurality of longitudinally spaced, transversely extending slats A having aligned longitudinally extending slots or grooves B formed in the undersurface thereof and having seated therein an assembly wire C. The wire C secures the slats into a composite assembly of the size and shape of a rough finished flooring block. The slats are spaced from one another so as to accommodate thermal and moisture expansion of the slats in use.

It will be particularly noted that the wire C terminates short of each longitudinal extremity of the block. This termination of the wire prevents any interference of the wire with a subsequent finishing operation wherein the edges of the block are trimmed to size and finished in conventional finishing apparatus. In one preferred embodiment of the present invention, the wire following its knurling has an effective diameter of about 0.05 inch and the slot B has a transverse dimension of about 0.04 inch. It will be seen that the wire is thus tightly embedded in the groove, the knurling of the wire positively engaging the grooving extremities and being in extended surface contact with those portions of each of the slats defining the grooves. The depth of the grooves is greater than the diameter of the wire, so that the wire is seated within the grooves beyond the lower extremity of the block, thus leaving the lower surface of the block plane so as to accommodate the later bonding of the block to a floor during installation of the block.

What I claim as my invention is:

1. In a method of making a parquet flooring block by the assembly of a group of individual elongated wooden slats, the steps of cutting a transverse groove adjacent each end of each of said slats, deflecting the group of slats into a concave configuration, conducting laterally spaced wire strands from a strand supply into contact with said slats in registry with said grooves, respectively, the free ends of said wire strands lying within the confines of said group of slats, inserting the wire strands into said grooves, severing a length of the wire strands from the supply within the confines of said group of slats, applying tension to the strand portion still connected to the supply to remove it longitudinally from the severed strand lengths inserted in said grooves, and retaining the free ends of said strands still connected to the supply for insertion into the grooves of the next succeeding group of slats.

2. In an apparatus for assembling successive groups of individual wooden slats into parquet flooring blocks, comprising a pair of laterally spaced conveyer chains adapted to receive slats thereon, means for driving said chains, means on said chains separating the slats into groups each sufficient to form a block, means intermediate said chains and underlying said slats for forming laterally spaced grooves in said slats, means defining an assembly surface convex about an axis transverse to the path of travel of said chains for abutting the non-grooved surfaces of said slats and deflecting said slats and chains to a conforming concave configuration, means guiding individual strands of wire into the slat grooves as said slats abut said surface, spring-biased means normally resisting movement of said strands in a direction counter to the direction of travel of said chains, cutting means for severing terminal portions of said strands, and means actuated by said cutting means to exert a tension force on the remaining portions of said strands to pull the remaining portions of strands in a direction counter to the direction of travel of said chains despite the resistance of said spring biased means.

3. In an apparatus for making flooring block, means for inserting and cutting a wire strand adapted to retain a group of grooved wooden slats in assembly and against a traveling supporting surface, comprising guide means aligned with a continuous groove in said group of slats, means supplying a strand of wire to said guide means under tension, cutting means for severing from said strand a terminal portion thereof beyond said guide means, means beyond said cutting means for forcing the severed wire terminal portion into said groove, a strand-engaging lug interposed between said guide means and said cutting means for normally preventing movement of said strand under tension and relative to said slats, and strand-deflecting means interposed between said guide means and said supply means to jerk the wire strand in a direction counter to the direction of travel of said surface and despite the action of said lug.

4. Apparatus for assembling parquet flooring units or the like from individual grooved wooden slats comprising a feed conveyor including a pair of transversely spaced support chains engageable with the terminal ends of the grooved surfaces of said slats, a series of transversely spaced and aligned lugs on each of said chains for separating said slats into groups, a rotatable forming drum, means guiding said chains circumferentially along the outer surface of said drum with said lugs projecting from said chains toward said drum, said slats being confined between the chains and the drum, the spacing between said lugs being related to the dimensions of said slats and said drum to cause said lugs to move the longitudinal edges of said slats adjacent said drum and parallel to the axis thereof into contact with each other and to separate the edges of said slats remote from said drum, guide means for guiding a wire into the block grooves exposed between said chains, and means for severing the wire.

5. Apparatus for assembling individual slats having one surface grooved into parquet flooring units or the like comprising a feed conveyor including a pair of transversely spaced chains, a series of transversely spaced and aligned lugs on each of said chains, means on said chains for contacting the grooved slat surfaces to support a group of slats between said chains, a rotatable forming drum, means guiding said chains circumferentially along the outer surface of said drum with said lugs projecting from said chains toward said drum, said chains confining said ungrooved surfaces of said slats against said drum outer surface, the spacing between said lugs being related to the dimensions of said slats and said drum to cause said lugs to move the edges of said slats adjacent said drum and parallel to the axis thereof into contact with each other and to separate the edges of said slats remote from said drum, and means for embedding a securing wire in the grooves of said slats forming each of said groups.

6. In a process of assembling component slats into unitary parquet flooring blocks or the like, the steps of forming a group composed of a plurality of elongated slats in parallel aligned relationship, grooving one surface of the slats to form a continuous groove traversing the entire group, contacting said group of slats with a convex arcuate surface rotatable about a fixed substantially horizontal axis, the longitudinal edges of said slats extending parallel to the axis of said surface and the ungrooved surfaces of said slats being in extended surface contact with said convex surface, advancing said slats continuously and in an arcuate path as said surface rotates past a plurality of relatively fixed work stations spaced peripherally of said surface and at which a knurled wire is guided into the grooves in those surfaces of the slats opposed to the slat surfaces contacting said arcuate surface, the wire is severed within the confines of said group, and the assembled slats and wire are removed from said arcuate surface.

7. In a method of making a parquet flooring block by the assembly of successive groups of individual elongated slats of rectangular cross-section, the steps of grooving each slat of each group, inserting a wire strand from a supply of wire into the grooves of a first group of slats, the free end of the wire strand terminating within the confines of a terminal slat of the first group, severing from the wire supply that portion of the wire strand encompassed within the confines of said first group, applying a tensile force to the wire strand portion still connected to the supply to remove the end thereof from said first group of slats, and retaining the free end of the supply connected wire strand portion for insertion into the next successive group of slats.

8. A method of assembling a group of individual wooden slats into a parquet flooring block which comprises orientating the slats in longitudinal alignment and in mutual edge-wise abutment with the slats disposed transversely of their path of travel, moving the slats as a group in said path of travel, concurrently slotting the undersurface of each of said slats adjacent each slat end while the slats are moving, forcing the group of slats to assume a concave configuration when viewed from their non-slotted surfaces, inserting a knurled wire into each of said slots while the slats are in said configuration, thereby forming the group of slats into an assembled block and finally releasing the assembled block from said concave configuration, thereby spacing the individual slats constituting the assembled block from edge-wise abutment with one another.

9. In a method of making a parquet flooring block by the assembly of a group of individual elongated wooden slats, the steps of cutting a transverse groove in one surface of each slat spaced from the ends of each of said slats, feeding into said grooves a small gauge flexible wire having an effective diameter slightly larger than the width of said grooves and severing the wire intermediate the edges of a terminal slat of the group of slats.

10. In a method of making a parquet flooring block by the assembly of a plurality of individual elongated slats of rectangular cross-section, the steps of transversely grooving each slat on the under-surface adjacent each end thereof, forcing into the grooves a small gauge flexible wire having an effective diameter slightly larger than the width of the grooves and cutting the wire while in the grooves intermediate the edges of a terminal slat of the group of slats.

References Cited in the file of this patent

UNITED STATES PATENTS

| | | |
|---|---|---|
| 921,618 | Murdock | May 11, 1909 |
| 1,796,880 | Allen | Mar. 17, 1931 |
| 1,859,633 | Rhinevault | May 24, 1932 |
| 1,977,080 | Newton | Oct. 16, 1934 |
| 2,038,000 | Parker | Apr. 21, 1936 |
| 2,113,076 | Bruce | Apr. 5, 1938 |
| 2,577,630 | Redin | Dec. 4, 1951 |
| 2,650,627 | Tibbals | Sept. 1, 1953 |
| 2,823,712 | Ranta | Feb. 18, 1958 |

FOREIGN PATENTS

| | | |
|---|---|---|
| 499,563 | Great Britain | Jan. 25, 1939 |
| 6,998 of 1911 | Great Britain | Mar. 21, 1911 |